| United States Patent [19] | [11] Patent Number: 4,870,116 |
|---|---|
| Wolbrom | [45] Date of Patent: Sep. 26, 1989 |

[54] DYE-CONTAINING POROUS PLASTIC ELEMENT AND METHOD OF MAKING IT

[76] Inventor: Irving M. Wolbrom, 44 Bayview Ave., Great Neck, N.Y. 11021

[21] Appl. No.: 225,868

[22] Filed: Dec. 19, 1988

Related U.S. Application Data

[62] Division of Ser. No. 177,333, Apr. 4, 1988, Pat. No. 4,797,246.

[51] Int. Cl.$^4$ .............................. C08J 9/24; B27J 5/00
[52] U.S. Cl. ..................................... 521/143; 264/26; 521/182; 521/184; 521/185; 521/919
[58] Field of Search ............... 521/143, 182, 184, 185, 521/919; 264/126

[56] References Cited

U.S. PATENT DOCUMENTS

| 3,019,201 | 1/1962 | Clancy et al. | 521/919 |
| 3,669,922 | 6/1972 | Bertsch et al. | 521/919 |
| 3,927,156 | 12/1975 | Yoshikawa et al. | 264/126 |
| 3,987,137 | 10/1976 | Neumann et al. | 264/126 |
| 4,115,500 | 9/1978 | Voegeli | 264/126 |
| 4,636,547 | 1/1987 | Engelmann et al. | 264/126 |
| 4,735,626 | 4/1988 | Smith et al. | 521/919 |

*Primary Examiner*—Morton Foelak
*Attorney, Agent, or Firm*—Alan H. Levine

[57] ABSTRACT

A dye-containing porous plastic element, comprising a plastic body having interconnected capillary passageways, and a dry, water-soluble dye located within the passageways. The passageways extend to at least one surface of the body, and the size of the passageways are such that the body, when contacted with water, can absorb the water to wet the dye and make it soluble. The plastic body comprises fused granules of plastic interspersed with dry granules of dye. The plastic granules may have a diameter, prior to fusion, of between about 50 and 800 microns, preferably between about 100 and 300 microns. The dry dye comprises between about 5 percent and 35 percent of the element, by weight, and preferably between about 10 percent and 20 percent. A method of making the dye-containing porous plastic element involves mixing together plastic granules and dry dye granules, and subjecting the mixture to heat and pressure so as to fuse the granules together into a porous body having interconnected capillary passageways and the dye granules within the passageways. A surfactant may be mixed together with the plastic and dye granules prior to subjecting the mixture to heat and pressures.

5 Claims, No Drawings

DYE-CONTAINING POROUS PLASTIC ELEMENT AND METHOD OF MAKING IT

This application is a division of application Ser. No. 177,333, filed Apr. 4, 1988 U.S. Pat. No. 4,797,246.

This invention relates to porous plastic elements containing dyes for dye transfer applications, e.g., writing instrument nibs and dye-containing stamps, and to a method of making such elements.

The term "porous plastic" is intended to refer to a synthetic resin or polymer body having an open cell construction which defines interconnected passageways throughout the body making the latter porous. The term "dye" is intended to refer to any colored material which is either wet and flowable, or which can be made so, e.g., inks, water colors, pastels.

Porous plastics having capillary porosity have been used for dye transfer applications. For example, such plastics are commonly used to make writing instrument nibs, the nibs transferring liquid ink from a reservoir in the writing instrument barrel to a writing surface contacted by the nib. In this situation, the pores of the plastic nib are filled with the liquid ink. Plastic elements of this type have been made by sintering plastic granules in a mold under heat and pressure to cause the granules to fuse, leaving interconnected pores between the granules.

Porous plastics containing their own supply of ink are known, and are commonly used to form the applicator end of a reuseable stamp. Such a material is described in U.S. Pat. Nos. 2,777,824 and 3,055,297. According to these patents, a thermoplastic resin is combined with a plasticizer to form a paste, and an organic liquid containing ink is added to the paste and heat applied. The organic liquid is a nonsolvent for the resin. The heat causes the resin to fuse, but the organic liquid maintains separations between the resin particles. The resultant product is a porous plastic material, the pores of which are filled with the organic liquid ink.

While this material is used successfully in various types of end products, it is not suitable for certain applications. Because the ink carried by the porous plastic is in a liquid form, it has a limited shelf life since it does dry out, even though the pores are capillary in nature. In addition, since the ink-filled pores extend to the surface of the plastic material, the latter is too messy to handle in some situations, and has a tendency to desorb the ink, which is unacceptable in certain environments.

It is an object of the present invention to provide a dye-containing porous plastic element which has a greatly extended, even indefinite, shelf life, can be handled cleanly without danger of the dye being transferred until such transfer is desired, and which exudes no dye until the time it is to be used.

According to the invention, a dry water-soluble dye is located within the interconnected capillary pores or passageways of a porous plastic element. The dye remains in a dry state until the product incorporating the plastic element is to be used, at which time the element is contacted with water. Since the porosity of the plastic is capillary in nature, the element absorbs the water, in a wicking action, and the water dissolves the dry dye thereby forming a liquid dye. This dye is available at the surface of the element, for transfer to a substrate, and as the dye from the surface is used, dye from the interior of the element flows to the surface, until substantially all the dye in the element is consumed. Should the element be put aside for a period long enough to allow any dye remaining in the element to dry out, it is merely necessary to contact the element again with water to redissolve the dried out dye and revitalize the element for further use.

A dye-containing porous plastic element can be made, according to this invention, by mixing together plastic granules and dry dye granules, and thereafter subjecting the mixture to sufficient heat and pressure to cause the plastic granules to fuse together. The presence of the dye granules maintains separations between the plastic granules, while permitting parts of the plastic granules to touch each other and fuse together. The result is a porous plastic element having interconnected passageways extending to the surface of the element, the passageways containing dry dye granules.

The plastic granules used to form a dye-containing porous plastic element according to the invention may be any suitable thermoplastic synthetic resin. Typical resins useful for this purpose are polyethylene, vinyl, polypropylene., polyester, and nylon, although many other resins may also be employed.

The size of the plastic granules should be such that their diameters, prior to fusing, are in the range between about fifty microns and eight hundred microns. If granules having diameters greater than 800 microns are used, there is some danger that the passageways created between the fused granules will be larger than capillary in size. If granules having diameters smaller than 50 microns are used, the intermixed dye granules may prevent the plastic granules from touching each other, thereby preventing their fusion into an integral element, and even if they do fuse, the pores left between them would likely be so small that water would not be absorbed by the dye-containing porous plastic element. Preferably, the plastic granules have diameters between one hundred and three hundred microns; this range of diameters yields porous plastic elements having adequate strength characteristics and good capillarity.

The dry dye granules employed should preferably have diameters smaller than those of the plastic granules with which they are used. Any suitable water-soluble dye can be used for the purposes of this invention, as long as it does not chemically react with the plastic, especially when the mixture is heated to fusing temperature of the plastic. Examples of such dyes are Acid Blue 73, Direct Blue 15, Acid Green 1, Acid Orange 8, and Acid Violet 49. The dye should be present in the mixture with the plastic granules, and hence in the fused porous plastic element, in an amount equal to between about five and thirty-five percent, by weight. If less than this amount of dye is present, the product employing the porous plastic element will be exhausted of dye very rapidly. On the other hand, if more than this amount of dye is present, it will interfere with bonding of the plastic particles to an extent which will adversely affect the integrity of the fused element. Preferably, the dye particles are present in an amount between about 10% and 20%, by weight; this range insures sufficient dye to give the product an adequate life before the dye is exhausted, without interfering with the structural integrity of the porous plastic element.

In some cases, it may be desirable to add a surfactant to the plastic/dye mixture so as to aid in absorption of water when the dye-containing porous plastic element is contacted with water. Examples of suitable surfactants are Triton X-100, sold by Rohm and Haas, and Atmos 300, sold by Imperial Chemical Industries. The surfactant may be present in an amount up to about one percent, by weight, of the total mixture.

To make the dye-containing porous plastic element, plastic and dry dye granules, and possibly a surfactant, are mixed together, placed in a mold, and subjected to heat and pressure. The temperature and pressure levels employed will depend upon the particular plastic used, and such values are known to, or readily determinable by, one skilled in the plastic molding art. The dye-containing porous plastic element produced in the mold may be used as is, or assembled with other parts to fabricate a finished product.

The dye-containing porous plastic element of the present invention has many potential uses. For example, it could serve as the writing nib of a writing instrument. If the nib is joined to, possibly molded with, a body of hydrophobic material serving as a means for holding the writing instrument, the nib need merely be dipped in water to cause it to absorb water which dissolves the dye and creates a porous nib filled with liquid dye for writing or drawing purposes. The writing nib could be joined to, or molded with, a porous hydrophilic body, in which case the rear end of the body could be dipped in water so as to transmit the water, by wicking, to the nib. In such a case, the body would be surrounded by a housing which is held by the user. Such a housing could be filled with water to serve as a reservoir for continuously feeding water to the nib, through the body, as the writing instrument is used.

An artist's palette could be made carrying raised areas made of the dye-containing porous plastic elements, each raised area containing a different color dye. By touching a porous plastic raised area with a wet brush, the dye therein is dissolved and available to be picked up by the brush for application to a surface being painted. An advantage of such a palette over conventional palettes carrying raised disks of water color paint is that the raised disks disintegrate as they are consumed, whereas the raised areas of a palette using porous plastic elements according to this invention maintain their shape as the dye within them is used. If the raised areas are molded on to a porous hydrophilic base, the base can be placed in water so as to wick water into the raised areas to dissolve the dyes which can then be picked up by touching the raised areas with a brush.

Elements according to the invention may be used as the applicator ends of reusable stamps. The end can be dipped in water and then pressed against a surface to transfer dye in the shape of the applicator to the surface. Novelty items, such as a "bleeding heart" may be made of a heart shaped porous plastic element containing red dye, dropping water on the heart causing it to exude a red liquid.

It will be appreciated that the dye-containing porous plastic element of this invention has an indefinite shelf life, since there is no danger of the dye becoming useless by drying out. At any time that the item incorporating the element is to be used, it is merely contacted with water to activate the dye. In addition, there is no danger of the dry dye being exuded prior to use, which would be unacceptable in certain situations. Thus, for example, if the element is used as a product packed as a premium in a box of breakfast cereal, there is no chance that the dye will ooze out of the porous plastic and contaminate the cereal.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A dye-containing porous plastic element extending to at least one surface of the body, and made by mixing together plastic granules having diameters of between about fifty and eight hundred microns, and water-soluble dry dye granules, and subjecting the mixture to heat and pressure so as to fuse the granules together into a porous body having interconnected capillary passageways and the dye granules within the passageways, the size of the capillary passageways being such that the body can absorb water to wet the dye and make it flowable.

2. An element as defined in claim 1 wherein the plastic granules have diameters, prior to fusing, of between about 100 and 300 microns.

3. An element as defined in claim 1 wherein the dry dye comprises between about 5% and 35% of the element, by weight.

4. An element as defined in claim 1 wherein the dry dye comprises between about 10% and 20% of the element, by weight.

5. An element as defined in claim 1 wherein the passageways contain a surfactant in addition to the dye.

* * * * *